United States Patent
Song et al.

(10) Patent No.: US 11,148,293 B2
(45) Date of Patent: Oct. 19, 2021

(54) MOTION COMPUTING DEVICE, ROBOT SYSTEM AND ROBOT CONTROLLING METHOD

(71) Applicant: NATIONAL CHIAO TUNG UNIVERSITY, Hsinchu (TW)

(72) Inventors: Kai-Tai Song, New Taipei (TW); Jen-Hao Chen, New Taipei (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 339 days.

(21) Appl. No.: 16/174,308

(22) Filed: Oct. 30, 2018

(65) Prior Publication Data
US 2019/0344445 A1    Nov. 14, 2019

(30) Foreign Application Priority Data
May 11, 2018 (TW) .................................. 107116182

(51) Int. Cl.
*B25J 9/16*    (2006.01)

(52) U.S. Cl.
CPC ........... *B25J 9/1697* (2013.01); *B25J 9/1664* (2013.01); *B25J 9/1666* (2013.01)

(58) Field of Classification Search
CPC ...... B25J 9/1697; B25J 9/1664; B25J 9/1666; B25J 9/1661; B25J 9/1694
See application file for complete search history.

(56) References Cited

U.S. PATENT DOCUMENTS

| | | | |
|---|---|---|---|
| 5,006,988 A * | 4/1991 | Borenstein | G05D 1/0255 180/169 |
| 5,150,026 A * | 9/1992 | Seraji | B25J 9/1643 318/567 |

(Continued)

FOREIGN PATENT DOCUMENTS

| | | |
|---|---|---|
| CN | 103991077 A | 8/2014 |
| TW | 201514041 A | 4/2015 |

(Continued)

OTHER PUBLICATIONS

K. T. Song et al., "Vision-based Adaptive Grasping of a Humanoid Robot Arm," Proceeding of the IEEE International Conference on Automation and Logistics, pp. 155-160, Aug. 2012.

(Continued)

*Primary Examiner* — Khoi H Tran
*Assistant Examiner* — Nhi Q Bui
(74) *Attorney, Agent, or Firm* — CKC & Partners Co., LLC (57) ABSTRACT

A robot controlling method includes: obtaining a depth image by a depth camera; receiving the depth image and obtaining an object parameter according to the depth image by a processing circuit; generating an attractive force parameter according to a target trajectory by the processing circuit; generating a repulsive force parameter according to a first vector between the object parameter and a robot by the processing circuit; generating a virtual force parameter according to a second vector between the object parameter and the robot by the processing circuit; and outputting a control signal to the robot to drive the robot according to the attractive force parameter, the repulsive force parameter and the virtual force parameter by the processing circuit.

17 Claims, 7 Drawing Sheets

(56) References Cited

U.S. PATENT DOCUMENTS

| | | | |
|---|---|---|---|
| 8,406,989 B1* | 3/2013 | Bhattacharyya | B25J 9/1666 |
| | | | 701/301 |
| 9,452,531 B2 | 9/2016 | Kikkeri et al. | |
| 2015/0070489 A1 | 3/2015 | Hudman et al. | |
| 2016/0075026 A1* | 3/2016 | Sisbot | G05D 1/0217 |
| | | | 700/255 |

FOREIGN PATENT DOCUMENTS

| | | |
|---|---|---|
| TW | 201518050 A | 5/2015 |
| TW | 201600270 A | 1/2016 |
| TW | 201622916 A | 7/2016 |
| TW | 201718209 A | 6/2017 |
| WO | 2011146259 A2 | 11/2011 |

OTHER PUBLICATIONS

Fabrizio Flacco et al., "A Depth Space Approach for Evaluating Distance to Objects with Application to Human-Robot Collision Avoidance," J. Intell. Robot Syst., vol. 80, Suppl. 1, S7-22, 2015.

Massimo Cefalo et al., "Parallel Collision Check for Snesor Based Real-Time Motion Planning," IEEE International Conference on Robotics and Automation (ICRA), pp. 1936-1943, May 29-Jun. 3, 2017.

* cited by examiner

MOTION COMPUTING DEVICE, ROBOT SYSTEM AND ROBOT CONTROLLING METHOD

RELATED APPLICATIONS

This application claims priority to Taiwan Application Serial Number 107116182, filed May 11, 2018, which is herein incorporated by reference.

BACKGROUND

Technical Field

The disclosure relates to a motion computing device, robot system and robot controlling method, particularly to a collaborative robot motion computing device, collaborative robot system and collaborative robot controlling method.

Description of Related Art

In recent years, with the rise of Industry 4.0 and intelligent automation, more and more collaborative robot related products have been developed in industrial automation applications.

Therefore, a collaborative robot capable of safely performing tasks in a common working environment with an operator is an important subject in the art.

SUMMARY

One aspect of the present disclosure is a robot controlling method. The robot controlling method includes: obtaining, by a depth camera, a depth image; receiving, by a processing circuit, the depth image and obtaining an object parameter according to the depth image; generating, by the processing circuit, an attractive force parameter according to a target trajectory; generating, by the processing circuit, a repulsive force parameter according to a first vector between the object parameter and a robot; generating, by the processing circuit, a virtual force parameter according to a second vector between the object parameter and the robot; and outputting, by the processing circuit, a control signal to the robot to drive the robot according to the attractive force parameter, the repulsive force parameter and the virtual force parameter.

Another aspect of the present disclosure is a motion computing device. The motion computing device includes a processing circuit, a memory and one or more programs. The memory is electrically connected to the processing circuit. The one or more programs are stored in the memory and configured to be executed by the processing circuit. The one or more programs include instructions for receiving a depth image obtained from a depth camera, obtaining an object parameter according to the depth camera, generating an attractive force parameter according to a target trajectory, generating a repulsive force parameter according to a first vector between the object parameter and a robot, generating a virtual force parameter according to a second vector between the object parameter and the robot, and outputting a control signal to the robot to drive the robot according to the attractive force parameter, the repulsive force parameter and the virtual force parameter.

Another aspect of the present disclosure is related to a robot system. The robot system includes a robot, a depth camera and a motion computing device. The robot includes a plurality of control points. The depth camera is configured to obtain a depth image. The motion computing device is configured to receive the depth image and output a control signal to drive the robot according to the depth image. The motion computing device includes a processing circuit, a memory and one or more programs. The memory is electrically connected to the processing circuit. The one or more programs are stored in the memory and configured to be executed by the processing circuit. The one or more programs include instructions for receiving the depth image obtained from the depth camera, obtaining an object parameter according to the depth camera, generating an attractive force parameter according to a target trajectory, generating a repulsive force parameter according to a first vector between the object parameter and the robot, generating a virtual force parameter according to a second vector between the object parameter and the robot, and outputting the control signal to the robot to drive the robot according to the attractive force parameter, the repulsive force parameter and the virtual force parameter.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the diagrams, some of the conventional structures and elements are shown with schematic illustrations.

Figure 1:
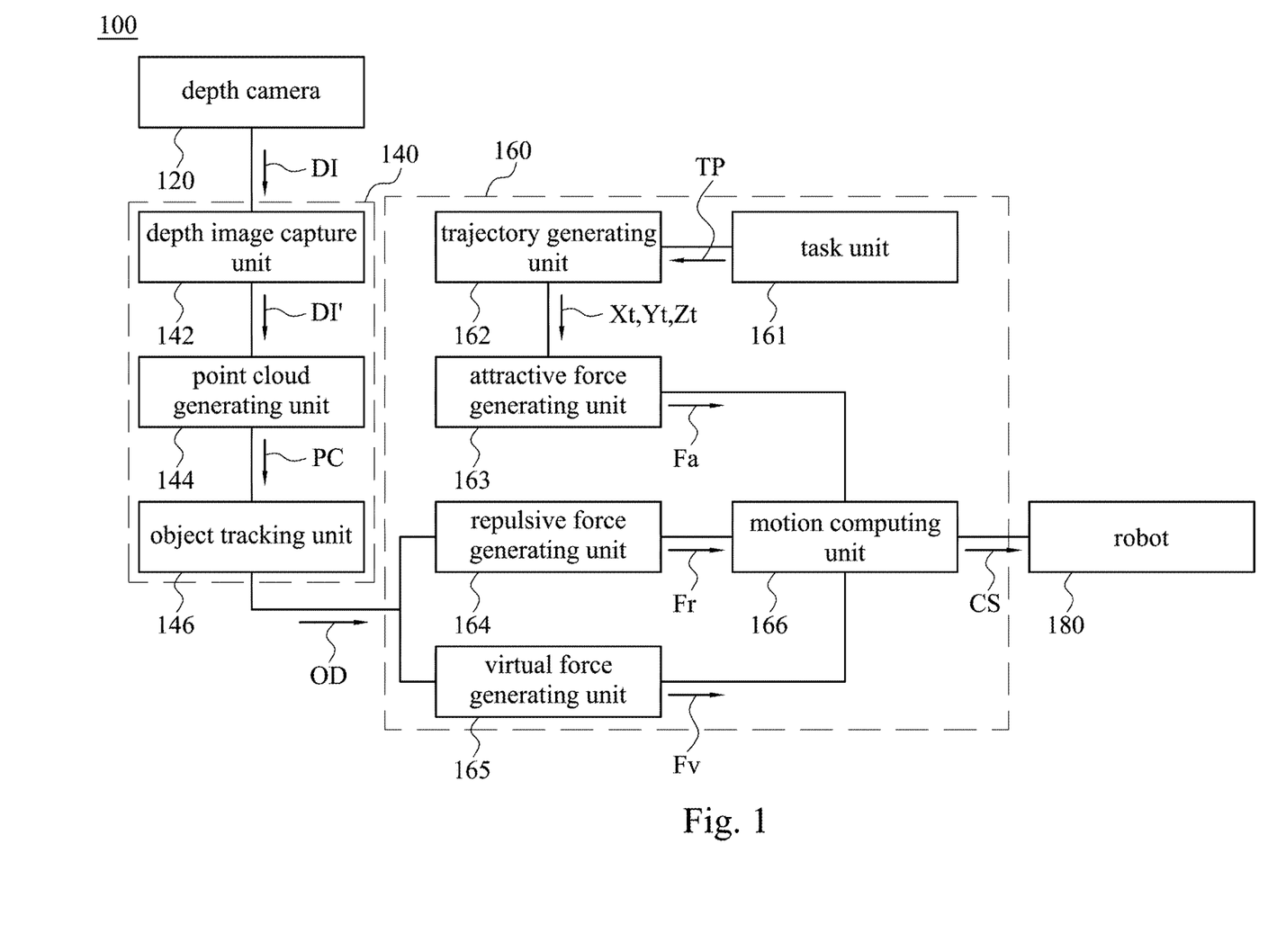
FIG. 1 is a schematic diagram illustrating a robot system in accordance with some embodiments of the disclosure.

Please refer to FIG. 1. FIG. 1 is a schematic diagram illustrating a robot system 100 in accordance with some embodiments of the disclosure. In some present embodiment, the robot system 100 includes a depth camera 120, a dynamical tracking module 140, a motion computing module 160 and a robot 180, in which the dynamical tracking module 140 and the motion computing module 160 are integrated into a motion computing device. In other word, in some embodiments, the motion computing device includes the dynamical tracking module 140 and the motion computing module 160 and is configured to receive a depth image DI from the depth camera 120 and output a control signal CS to drive the robot 180. Specifically, the depth camera 120 may be realized by KinectV2 RGB-D depth camera. The robot 180 may be realized by TM collaborative robot arm of Techman Robot. It should be noted that, above contents are merely possible embodiments, not intended to limit the present disclosure.

In structure, the depth camera 120 is electrically coupled to the dynamical tracking module 140 of the motion computing device. The dynamical tracking module 140 is electrically coupled to the motion computing module 160. The robot 180 is electrically coupled to the motion computing module 160 of the motion computing device. In operation, the depth camera 120 is configured to obtain the depth image DI. The motion computing device is configured to receive the depth image DI, and generate the control signal CS by calculating according to the depth image DI, and output the control signal CS to the robot 180 to drive the robot 180 to actuate.

In some embodiments, the dynamical tracking module 140 includes a depth image capture unit 142, a point cloud generating unit 144 and an object tracking unit 146. The motion computing module 160 includes a task unit 161, a trajectory generating unit 162, an attractive force generating unit 163, a repulsive force generating unit 164, a virtual force generating unit 165 and a motion computing unit 166.

In structure, the depth image capture unit 142 is electrically coupled to the depth camera 120 and the point cloud generating unit 144. The point cloud generating unit 144 is electrically coupled to the object tracking unit 146. The object tracking unit 146 is electrically coupled to the repulsive force generating unit 164 and the virtual force generating unit 165. The task unit 161 is electrically coupled to the trajectory generating unit 162. The trajectory generating unit 162 is electrically coupled to the attractive force generating unit 163. The motion computing unit 166 is electrically coupled to the attractive force generating unit 163, the repulsive force generating unit 164, the virtual force generating unit 165 and the robot 180.

The above dynamical tracking module 140, motion computing module 160 and functional units therein may be implemented by various hardware or software, such as a circuit (whether a dedicated circuit or general circuit operated under the control of one or more processors and encoding instructions). In general, the processing circuit includes transistors or other circuit components for controlling the operations and the functions of the corresponding electrical circuit described in this disclosure.

For example, in some embodiments, the motion computing device includes a processing circuit, a memory and one or more programs. The memory is electrically connected to the processing circuit. The one or more programs are stored in the memory and configured to be executed by the processing circuit. In operation, the processing circuit is able to execute the one or more programs and/or instructions stored in the memory to deal with the various data of the motion computing device and execute the various function units of the motion computing device.

For example, the processing circuit may be realized by central processor, microprocessor, digital signal processor (DSP), complex programmable logic device (CPLD), field-programmable gate array (FPGA). In addition, the memory includes one or more memory devices, and each memory device or multiple memory devices include a computer readable recording medium storing program. The memory may be realized by a read-only memory (ROM), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains.

It should be noted that the ways to realize the motion computing device are not limited by the embodiments above. Furthermore, the connections between these devices and elements are not limited by the embodiments above. The devices, the elements and the connections between them enable the motion computing device to implement any of the configurations described following, and/or may be applied here in the claims.

Figure 2:
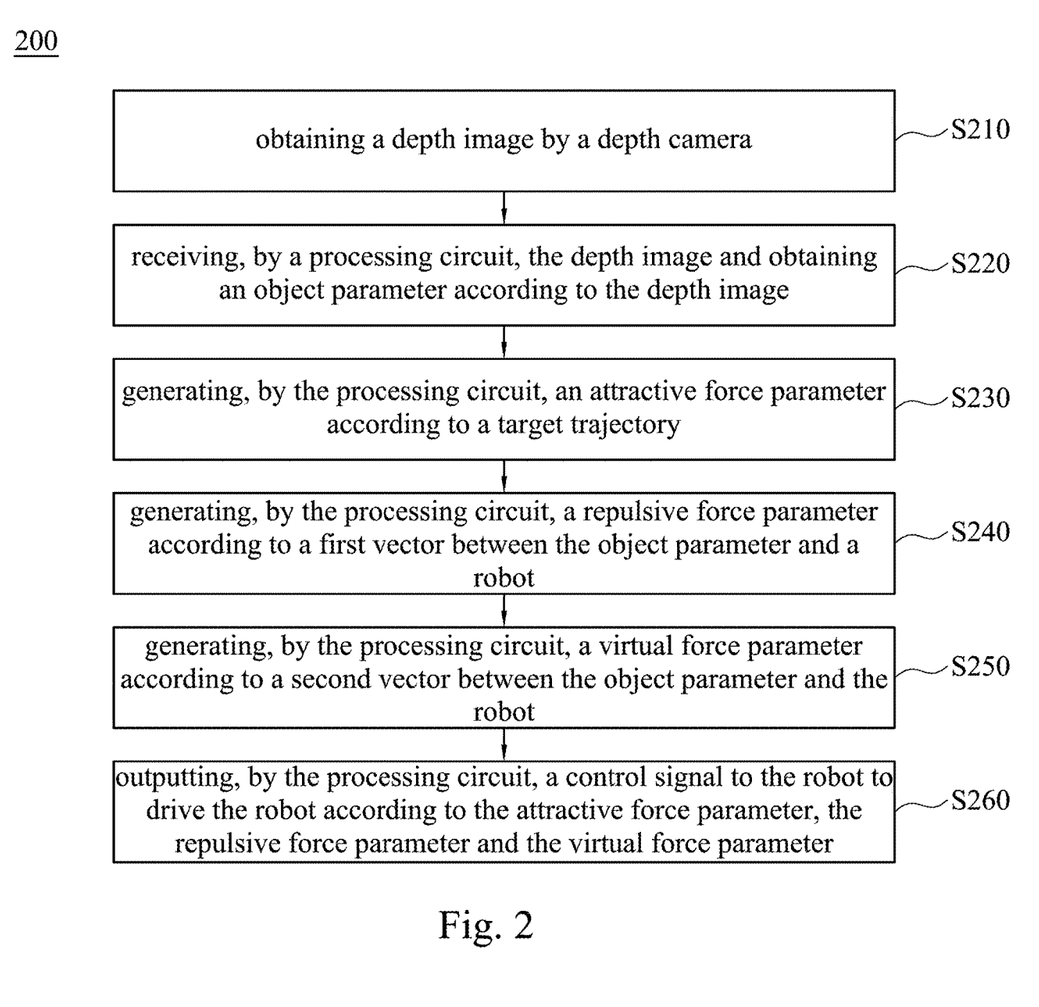
FIG. 2 is a flowchart illustrating a robot controlling method in accordance with some embodiments of the disclosure.

Please refer to FIG. 2. FIG. 2 is a flowchart illustrating a robot controlling method 200 in accordance with some embodiments of the disclosure. For the convenience and clarity of explanation, the following robot controlling method 200 will be explained with the robot system 100 shown in FIG. 1, but not intended to limit it. Various alterations and modifications may be performed on the disclosure by those of ordinary skilled in the art without departing from the principle and spirit of the disclosure. As shown in FIG. 2, the robot controlling method 200 includes operations S210, S220, S230, S240, S250 and S260.

First, in operation S210, obtaining a depth image DI by a depth camera 120.

Next, in operation S220, receiving, by a processing circuit, the depth image DI and obtaining an object parameter OD according to the depth image DI. Specifically, the depth image capture unit 142 of the dynamical tracking module 140 in the motion computing device receives the depth image DI, and capture an object from the background according to the cropped depth image DI' generated according to the depth image DI. A point cloud PC is generated by the point cloud generating unit 144 according to the cropped depth image DI'. The object parameter OD is generated by the object tracking unit 146 according to the point cloud PC, and the object parameter OD is sent to the motion computing module 160.

For example, in some embodiments, the depth image capture unit 142 enables the depth image DI to be removed of the robot image through a stereo model mask. Afterward, the depth image DI without the robot image is performed image segmentation according to multiple pre-storage without staffs or objects to separate the staffs or the objects in the environment from the static background images. Next, the point cloud generating unit 144 generates the point cloud PC according to the cropped depth image DI', and filter out environmental noise and optimize the number of point cloud PC by the voxel grid filter. Then, the object tracking unit 146 uses the k-nearest neighbors (KNN) algorithm to perform point cloud clustering, and searches for one among point clouds of which the distance between the point cloud PC and the robot 180 is shortest to regard as the obstacle point OP. Finally, the object tracking unit 146 uses the Kalman filter to predict and update the position and velocity of the obstacle point OP moving in space.

In this way, the dynamical tracking module 140 is able to obtain the depth image DI according to the depth camera 120, and generate the object parameter OD with high reliability, robustness and low noise interference.

Please still refer to FIG. 2. Next, in operation S230, generating, by the processing circuit, an attractive force parameter Fa according to a target trajectory Xt, Yt, Zt. Specifically, the target position TP is obtained by the processing circuit according to a task, and the target trajectory Xt, Yt, Zt is generated according to the target position TP and the present position of the robot 180, and the attractive force parameter Fa is generated according to the target trajectory Xt, Yt, Zt.

In other words, as shown in FIG. 1, the target position TP is generated by the task unit 161 according to the task, and the target position TP is outputted to the trajectory generating unit 162. The trajectory generating unit 162 is configured to generate the target trajectory Xt, Yt, Zt according to the shortest vector between the target position TP and the present position of the robot 180, and output the target trajectory Xt, Yt, Zt to the attractive force generating unit 163. The attractive force generating unit 163 generates the attractive force parameter Fa according to the target trajectory Xt, Yt, Zt through the following formula:

$$\vec{F_a} = \frac{f_a(A, d_{goal})\vec{V}_{goal}}{d_{goal}}$$

$$f_a(A, d_{goal}) = A\left(1 - e^{-d_{goal}/\alpha}\right)$$

$\vec{F_a}$ represents the attractive force parameter Fa, $f_a$ represents the value of the attractive force parameter Fa, $\vec{V}_{goal}$ represents the vector of the target trajectory Xt, Yt, Zt, $d_{goal}$ represents the length of the target trajectory Xt, Yt, Zt, A represents the largest value of the attractive force, and α is a shaping factor. In some embodiments, A may be about 1 meter/second, and α may be about 0.4 meter. It should be noted that the values above are merely possible embodiments, but not intended to limit the present disclosure.

In this way, the attractive force parameter Fa is larger when distance between the robot 180 and the target position TP is longer. The attractive force parameter Fa is smaller when distance between the robot 180 and the target position TP is shorter. The attractive force parameter Fa is zero when distance is zero.

Please still refer to FIG. 2. Next, in operation S240, generating, by the processing circuit, a repulsive force parameter Fr according to a first vector V1 between the object parameter OD and a robot 180. In other words, as shown in FIG. 1, the repulsive force generating unit 164 receives the object parameter OD from the dynamical tracking module 140, and generates the repulsive force parameter Fr according to the object parameter OD. Specifically, the processing circuit regards the obstacle point OP in the object parameter OD as initial point of the first vector V1, and regards an end effector EE of the robot 180 as terminal point of the first vector V1. And the processing circuit regards the first vector V1 as direction of the repulsive force parameter Fr, and adjusts value of the repulsive force parameter Fr according to value of the first vector V1. In some embodiments, the end effector EE may include jaws. In some other embodiments, the end effector EE may include tools for special purpose processing or interaction of objects. In other words, the end effector EE may be an object that is arranged at the end of the robot 180 to interact with the environment. It should be noted that the contents above are merely possible embodiments, but not intended to limit the present disclosure.

Figure 3A:
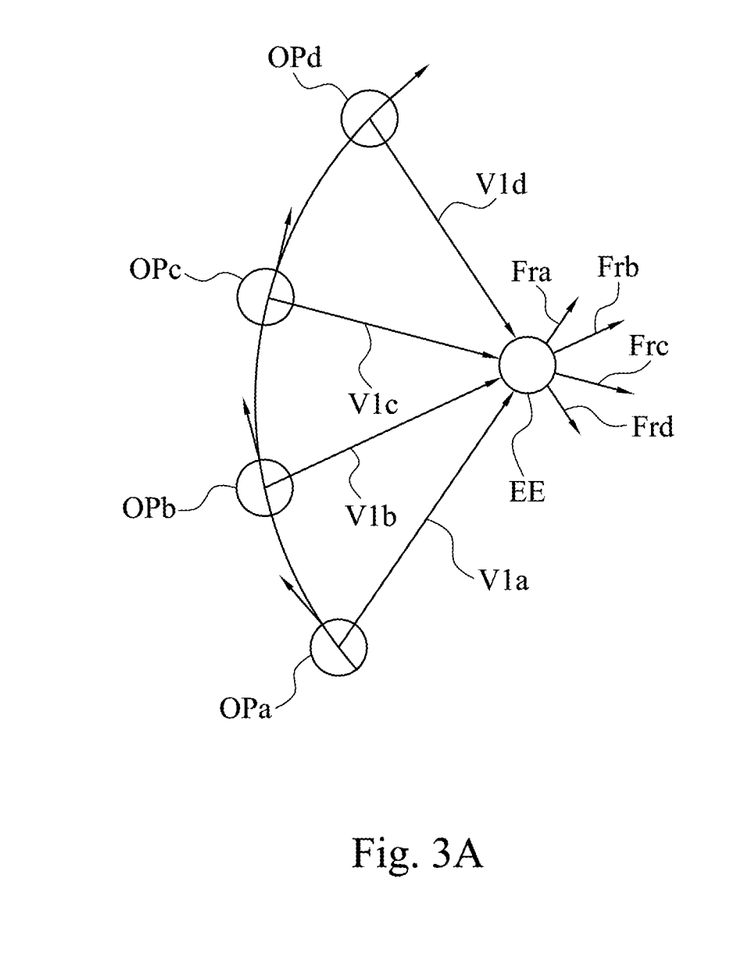
FIGS. 3A and 3B are detailed schematic diagrams illustrating of an object and a robot in accordance with some embodiments of the disclosure.
Figure 3B:
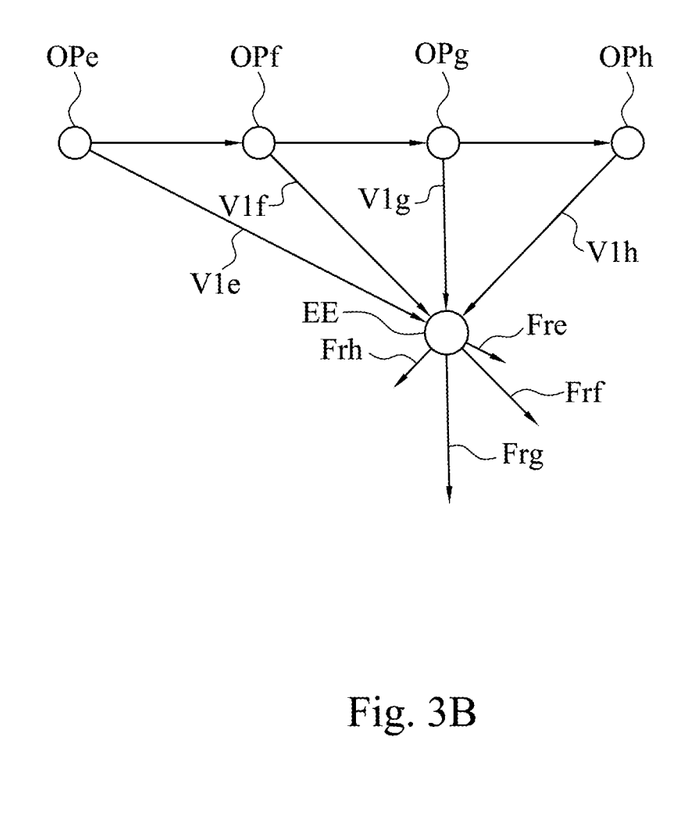

Specifically, as shown in FIGS. 3A and 3B, in some embodiments, the processing circuit regards the end effector EE of the robot 180 as terminal point of the first vector V1a~V1h, and regards positions of the obstacle point OPa~OPh at different time as corresponding initial points of the first vector V1a~V1h. In addition, the processing circuit regards the first vector V1a~V1h at different time as direction of the repulsive force parameter Fra~Frh respectively, and adjusts values of the first vector V1a~V1h at different time according to values of the repulsive force parameter Fra~Frh respectively. In other word, direction of the repulsive force parameter Fr is as same as direction of the first vector V1, so that the end effector EE of the robot 180 is enabled to dodge according to direction that away from the obstacle point OP and will not collide with the objects in the environment during operation.

Further explanation, in some embodiments, the repulsive force generating unit 164 generates the repulsive force parameter Fr according to the obstacle point OP in the object parameter OD through the following formula:

$$\vec{F_r} = f_r(EE, OP) = \frac{\vec{V_1}(EE, OP)}{\|\vec{V_1}(EE, OP)\|}$$

$$f_r(EE, OP) = \frac{R}{1 + e^{(\|\vec{V_1}(EE,OP)\|(\frac{2}{\rho})-1)\alpha}}$$

$\vec{F_r}$ represents the repulsive force parameter Fr, $f_r$ represents value of the repulsive force parameter Fr, $\vec{V_1}$ represents first vector V1 between the obstacle point OP in the object parameter OD and the end effector EE of the robot 180, R represents the largest value of the repulsive force parameter Fr, ρ represents radius of a spherical dangerous zone around the end effector EE. In some embodiments, R may be about 3 meter/second, ρ may be about 0.5 meter, α may be about 8 meter. It should be noted that the values above are merely possible embodiments, but not intended to limit the present disclosure.

In this way, the first vector V1 will change instantaneously with the relative position of the end effector EE and the obstacle point OP when both the robot 180 and the object parameter OD are moving dynamically, so that the repulsive force parameter Fr is able to be converted according to the first vector V1 through smooth curve. Accordingly, value of the repulsive force parameter Fr will approach the maximum value R when distance between the obstacle point OP and the end effector EE is zero. On the other hand, value of the repulsive force parameter Fr is zero when distance between the obstacle point OP and the end effector EE is larger than ρ.

Please still refer to FIG. 2. Next, in operation S250, generating, by the processing circuit, a virtual force parameter Fv according to a second vector V2 between the object parameter OD and the robot 180. In other words, as shown in FIG. 1, the virtual force generating unit 165 receives the object parameter OD from the dynamical tracking module 140 and generates the virtual force parameter Fv according to the object parameter OD. Specifically, the processing circuit regards the obstacle point OP in the object parameter OD as initial point of the second vector V2, and regards one of control points CP of the robot 180 that is closest to the obstacle point OP as the critical control point KP, and regards the critical control point KP as terminal point of the second vector V2. In addition, the processing circuit regards direction of the second vector V2 as direction of the virtual force parameter Fv when direction of the second vector V2 and an acting direction of the critical control point KP is opposite. The processing circuit sets the virtual force parameter Fv to be zero when direction of the second vector V2 and the acting direction of the critical control point KP is not opposite.

Figure 4:
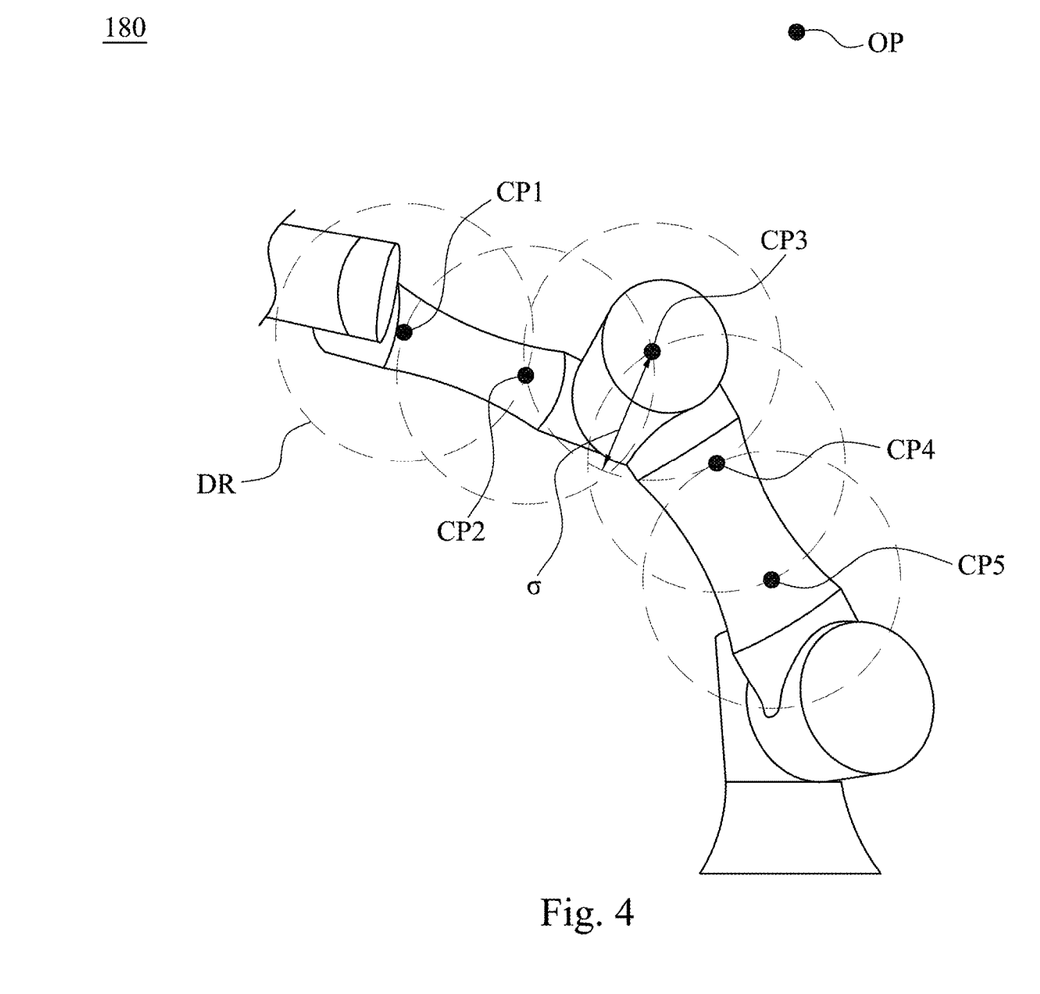
FIG. 4 is a schematic diagram illustrating of a robot in accordance with some embodiments of the disclosure.

For example, as shown in FIG. 4, in some embodiments, the robot 180 may be a robot arm including five control points CP1~CP5, in which the control point closest to the obstacle point OP is CP3. Accordingly, the processing circuit regards the control point CP3 as the critical control point KP. In some other embodiments, according to actual need, the robot 180 may not limit to the robot are, the robot 180 may be any suitable structure, and according to actual need, the robot 180 may include any integer number of the control points. In addition, the dangerous zone DR is arranged according to each control point of the robot 180 respectively. The robot 180 will generate the virtual force parameter Fv to dodge when the obstacle point OP in the object parameter OD enters the dangerous zone DR, so as to protect the body and/or the link of the robot. In some embodiments, as shown in FIG. 4, the dangerous zone DR may be a sphere range around the control point.

Figure 5:
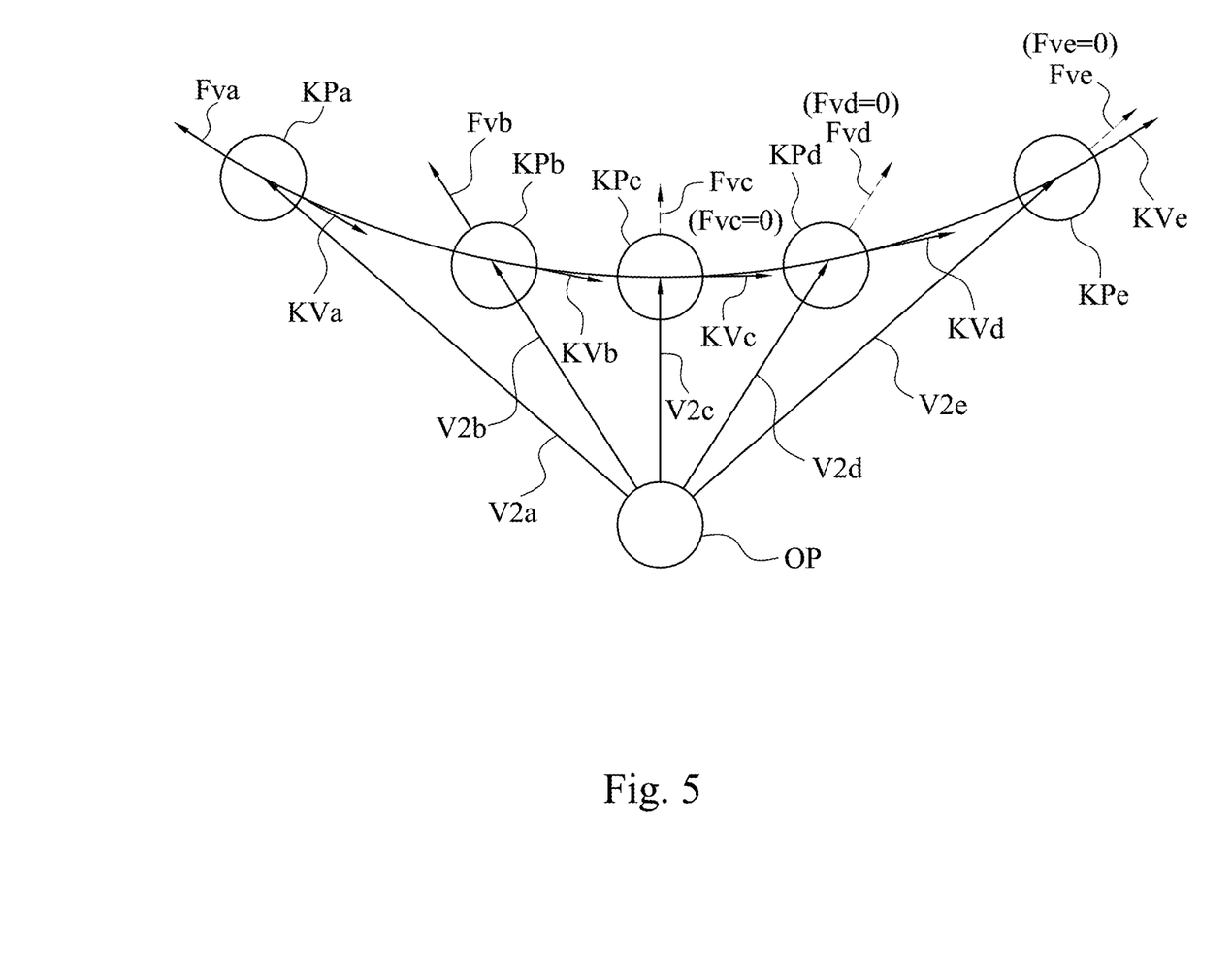
FIG. 5 is a schematic diagram illustrating of an object and a robot in accordance with some other embodiments of the disclosure.

Further explanation, as shown in FIG. 5, in some embodiments, the processing circuit regards the obstacle point OP as initial point of the second vector V2a~V2e, and regards positions of the critical control point KP of the robot 180 at different times as corresponding terminal points of the second vector V2a~V2e. In addition, the processing circuit regards the second vectors V2a~V2e at different times as direction of the virtual force parameter Fva~Fve, and adjusts values of the virtual force parameter Fva~Fve according to values of the second vector V2a~V2e at different times. Next, the virtual force parameters Fva~Fve are adjusted according to whether the acting directions KVa~KVe of the critical control points KPa~KPe and the second vectors V2a~V2e are in the same direction.

For example, as shown in FIG. 5, the processing circuit regards direction of the second vector V2 as direction of the virtual force parameter Fva when the acting direction KVa of the critical control point KPa and direction of the second vector V2a approaches to opposite. The processing circuit sets the virtual force parameter Fvc to be zero when the acting direction KVc of the critical control point KPc and direction of the second vector V2c are perpendicular to each other (not opposite). The processing circuit sets the virtual force parameter Fve to be zero when the acting direction KVe of the critical control point KPe and direction of the second vector V2e approach to the same direction.

Further explanation, in some embodiments, the virtual force generating unit 165 generates the virtual force parameter Fv according to the obstacle point OP in the object parameter OD through the following formula:

$$\vec{F_v} = f_v(KP, OP) = \frac{\vec{V_2}(KP, OP)}{\|\vec{V_2}(KP, OP)\|}$$

$$f_v(KP, OP) = \frac{K_v}{1 + e^{(\|\vec{V_2}(KP,OP)\|(\frac{2}{\sigma})-1)\alpha}}$$

$\vec{F_v}$ represents the virtual force parameter Fv, $f_v$ represents value of the virtual force parameter Fv, $\vec{V_2}$ represents the second vector V2 between the obstacle point OP of the object parameter OD and the critical control point KP of the robot 180, $K_v$ represents the largest value of the virtual force parameter Fv (i.e., moving speed of the critical control point KP), σ a represents radius of a spherical dangerous zone around the critical control point KP (as shown in FIG. 4). In some embodiments, σ radius and ρ radius are the same. In some other embodiments, σ radius and ρ radius may be different.

In this way, the second vector V2 will change instantaneously with the relative position of the critical control point KP and the obstacle point OP when the obstacle point OP in the object parameter OD enters the dangerous zone of the robot 180, so that the virtual force parameter Fv may be generated according to the second vector V2 and so as to avoid the body of the robot 180 to be collided to the objects in the environment during operation. In addition, the virtual force parameter Fv is adjusted according to moving speed of the critical control point KP. In this way, the virtual force parameter Fv may be a damping so as to avoid distance between the control point and the obstacle point OP too short. In other words, value of the virtual force parameter Fv is larger when the critical control point KP approaches the obstacle point OP, so that the moving speed of the critical control point KP is reduced and approaches to zero, but it does not cause the critical control point KP to move in the opposite direction and cause an additional burden.

Please still refer to FIG. 2. Next, in operation S260, outputting, by the processing circuit, a control signal CS to the robot 180 to drive the robot 180 according to the attractive force parameter Fa, the repulsive force parameter Fr and the virtual force parameter Fv. In other words, as shown in FIG. 1, the motion computing unit 166 receives the attractive force parameter Fa from the attractive force generating unit 163, and receives the repulsive force parameter Fr from the repulsive force generating unit 164, and receives the virtual force parameter Fv from the virtual force generating unit 165. The motion computing unit 166 generates the control signal CS according to the attractive force parameter Fa, the repulsive force parameter Fr and the virtual force parameter Fv. Specifically, the processing circuit adds the attractive force parameter Fa and the repulsive force parameter Fr and converts into a speed command, and converts the virtual force parameter Fa into a constrained command. In addition, the processing circuit obtains the control signal CS according to the speed command and the constrained command.

Figure 6:
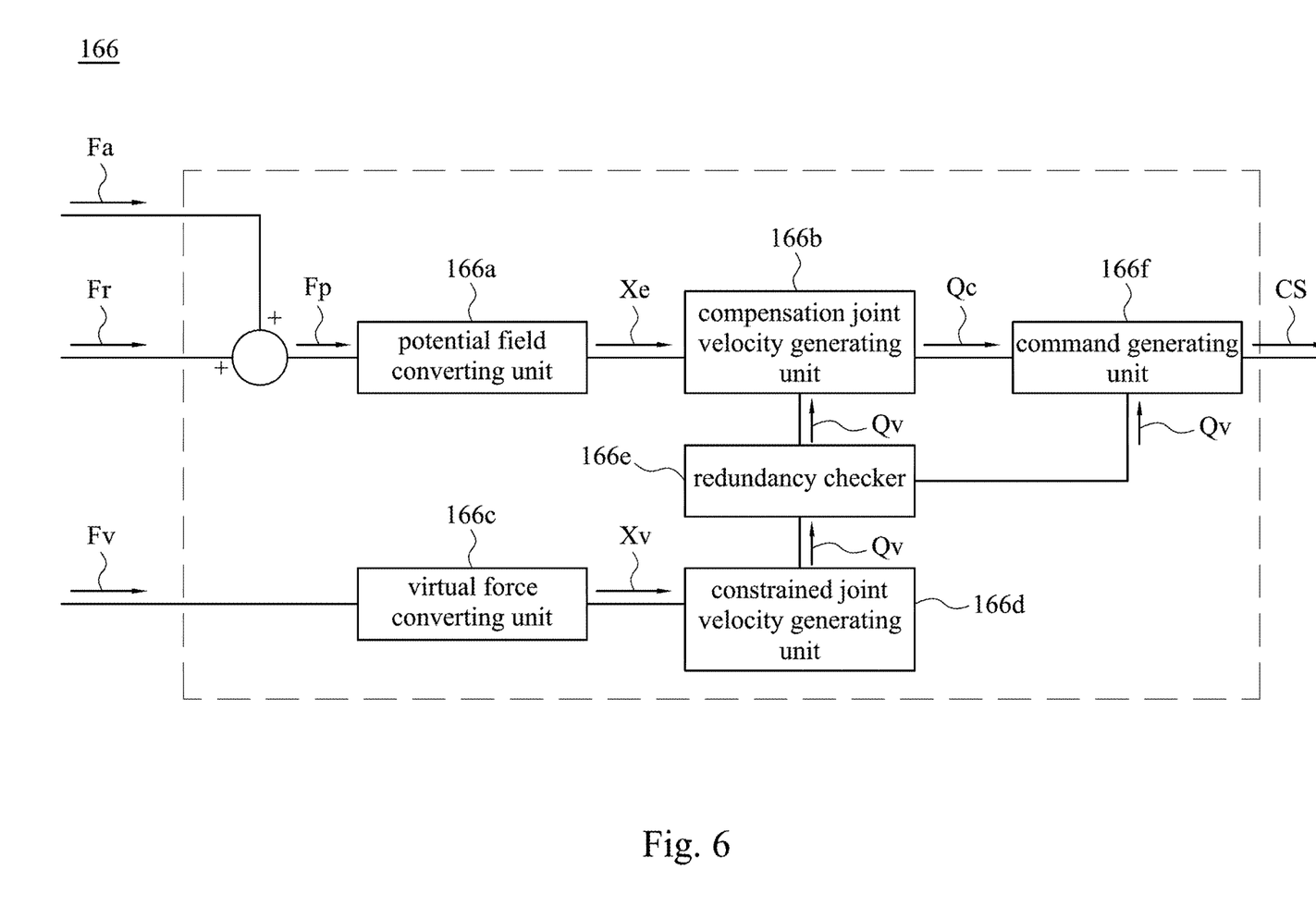
FIG. 6 is a detailed schematic diagram illustrating of a robot in accordance with some other embodiments of the disclosure.

Further explanation, as shown in FIG. 6, in some embodiments, the motion computing unit 166 adds the attractive force parameter Fa and the repulsive force parameter Fr to become a potential field parameter Fp. The potential field converting unit 166a converts the potential field parameter Fp into the moving speed Xe. Next, the compensation joint velocity generating unit 166b converts the moving speed Xe into a joint velocity through the following formula:

$$\dot{q}_e = J\#(q)\dot{X}_e$$

$\dot{q}_e$ represents the joint velocity, J # represents a pseudo-inverse matrix of J, J represents a Jacobian matrix. In this way, the motion computing unit 166 regards the joint velocity as the speed command to send to the robot 180 when there is no staff or object in the environment.

On the other hand, a virtual force converting unit 166c converts the virtual force parameter Fv into the constrained velocity Xv. A constrained joint velocity generating unit 166d converts the constrained velocity Xv into the constrained joint velocity Qv through the following formula:

$$\dot{q}_v = J\#_v(q_v)\dot{X}_v, J_v = (j_c|O)$$

$\dot{q}_v$ represents the constrained joint velocity Qv, $J\#_v$ represents a pseudo-inverse matrix of $J_v$, $J_v$ may be $J_c$ matrix followed by a zero matrix O to make the dimensions the same, $J_c$ represents a Partial Jacobian matrix.

Next, a redundancy checker 166e determines whether the number of redundant joints is able to perform compensation. For example, as the robot 180 includes seven control points, if the one closest to the obstacle point OP among control points is the penultimate control point from the end, then the number of the constrained control points is five and the compensation control points is two. Due to the number of the constrained control points is larger than the number of the compensation control points, then the redundancy checker 166e sends the constrained joint velocity Qv to a command generating unit 166f. The command generating unit 166f sends the constrained joint velocity Qv as the control signal CS to the robot 180. In other words, since the number of the compensation control points is not enough, the motion computing unit 166 will abandon the original task to avoid the robot 180 to collide.

For another example, as the robot 180 includes seven control points, if the one closest to the obstacle point OP among control points is the third control point, then the number of the constrained control points is three and the number of the compensation control point is four. Due to the number of the compensation control points is larger than the number of constrained control points, the redundancy checker 166e output the constrained joint velocity Qv to the compensation joint velocity generating unit 166b. The compensation joint velocity generating unit 166b generates a compensation joint velocity Qc according to the moving speed Xe and the constrained joint velocity Qv through the following formula:

$$\dot{q}_c = (JW)\# \dot{X}_e^t, \dot{X}_e^r = \dot{X}_e - J(I-W)\dot{q}_v$$

$\dot{q}_c$ represents the compensation joint velocity Qc, I represents Identity matrix, W represents Diagonal matrix and the element $W_{ii}$ on the diagonal is 0 or 1 to mark whether the i-th control point is a constrained control point.

Finally, the command generating unit 166f adds the compensation joint velocity Qc and the constrained joint velocity Qv together as the control signal CS. In this way, the robot 180 is able to adjust compensation control points to perform the original task without colliding when the object or staffs enters the environment.

The above robot controlling method 200 is described in accompanying with the embodiments shown in FIG. 1 to FIG. 6, but not limited thereto. Various alterations and modifications may be performed on the disclosure by those of ordinary skilled in the art without departing from the principle and spirit of the disclosure. It should be noted that, in some embodiments, the above robot controlling method 200 may also be realized by a computer program. When the computer program is executed by a computer, an electric device or the processing circuit in the motion computing device illustrating in FIG. 1, the actuator executes the robot controlling method 200. The computer programs may be stored in a non-transitory computer readable recording medium, such as a read-only memory (ROM), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains.

Figure 7:
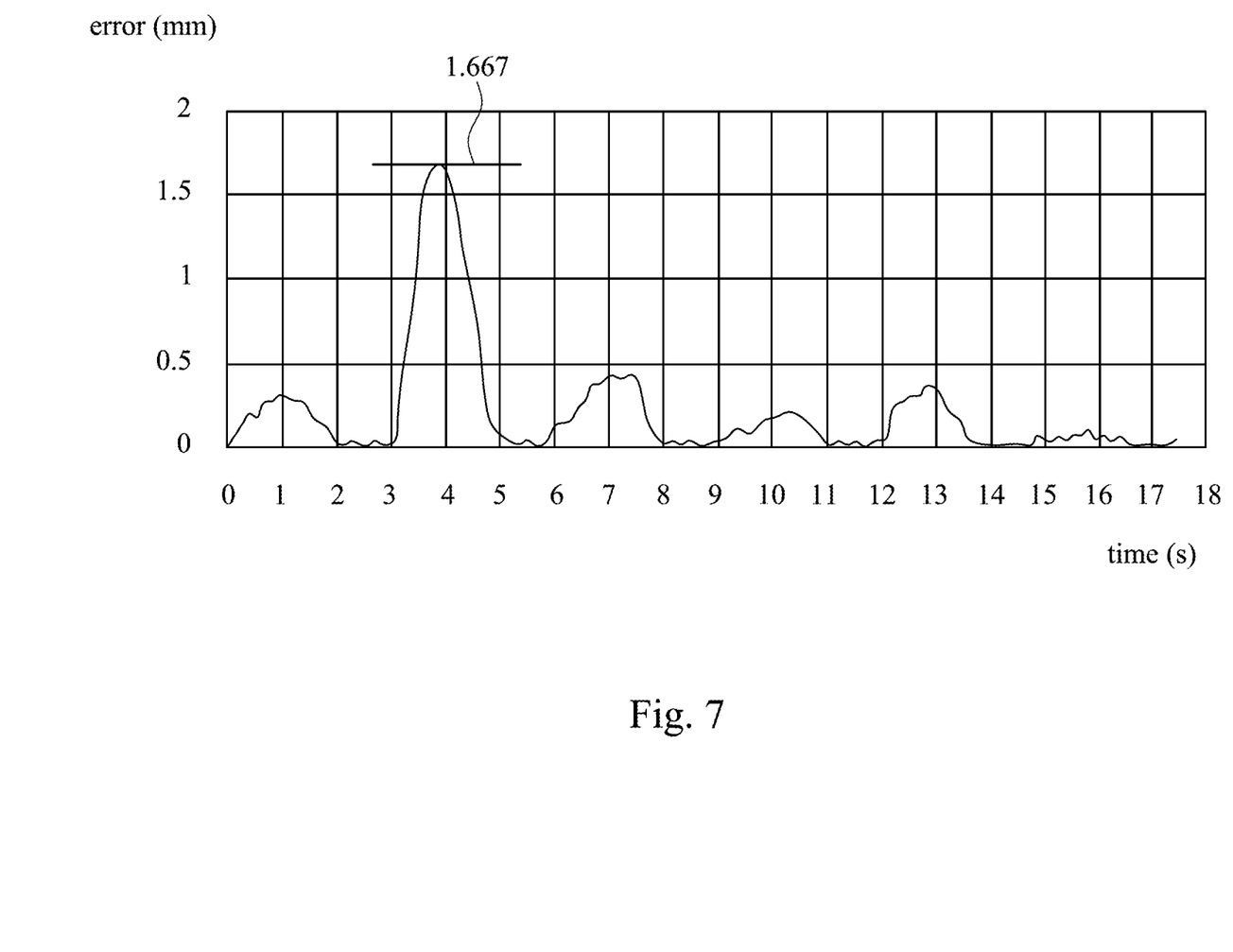
FIG. 7 is a diagram illustrating of experimental data in accordance with some embodiments of the disclosure.

Please refer to FIG. 7. FIG. 7 is a diagram illustrating of experimental data in accordance with some embodiments of the disclosure. In some embodiments, the robot 180 performs the task by the end effector EE. As shown in FIG. 7, the error of the moving trajectory of the end effector EE of the robot 180 is calculated in the two cases that there are no objects or people entering the environment and obstacles appear in the environment, the maximum translation error is about 1.667 mm. Therefore, through the above experimental results, it is verified that the motion computing device, the robot system and the control method of the present disclosure is able to effectively avoid collision between the robot and the obstacle in the environment, and at the same time maintain the original working trajectory, and the range of the trajectory average error is approximately 0.2 mm.

In the foregoing, exemplary steps are included. However, these steps do not need to be performed sequentially. The steps mentioned in the embodiment may be adjusted according to actual needs unless the order is specifically stated, and may even be performed simultaneously or partially simultaneously.

Furthermore, each of the above embodiments may be implemented by various types of digital or analog circuits or by different integrated circuit chips. Individual components may also be integrated into a single control chip. Various control circuits may also be implemented by various processors or other integrated circuit chips. The above is only an example, and it should not limit the present disclosure.

In summary, in various embodiments of the present disclosure, using the depth camera to detect and track objects in the environment, generating the point clouds through the depth image with filtered the background, using the KNN algorithm to perform point clouds clustering and searching for the obstacle point closest to the robot, and then predicting position and moving speed of the obstacle point via the Kalman filter achieve accurate object tracking. Next, using the attractive force generated by the target position, the repulsive force and virtual force generated respectively by the first vector and the second vector between the object parameter and the robot enable the robot not only avoid the obstacle object but maintain the original task trajectory of the robot arm at the same time.

Although specific embodiments of the disclosure have been disclosed with reference to the above embodiments, these embodiments are not intended to limit the disclosure. Various alterations and modifications may be performed on the disclosure by those of ordinary skills in the art without departing from the principle and spirit of the disclosure. Thus, the protective scope of the disclosure shall be defined by the appended claims.

What is claimed is:

1. A robot controlling method, comprising:
obtaining, by a depth camera, a depth image;
receiving, by a processing circuit, the depth image and obtaining an object parameter according to the depth image;
generating, by the processing circuit, an attractive force parameter according to a target trajectory;
regarding, by the processing circuit, an obstacle point of the object parameter as initial point of a first vector and a second vector;
regarding, by the processing circuit, an end effector of a robot as terminal point of the first vector;
generating, by the processing circuit, a repulsive force parameter according to the first vector;
regarding, by the processing circuit, a closest control point to the obstacle point among a plurality of control points of the robot as a critical control point, and regarding the critical control point as terminal point of the second vector;
generating, by the processing circuit, a virtual force parameter according to the second vector; and outputting, by the processing circuit, a control signal to the robot to drive the robot according to the attractive force parameter, the repulsive force parameter and the virtual force parameter.

2. The robot controlling method of claim 1, further comprising:
generating, by the processing circuit, an object point cloud according to the depth image; and
obtaining, by the processing circuit, the object parameter according to the object point cloud, wherein the object parameter comprises an obstacle point.

3. The robot controlling method of claim 1, further comprising:
obtaining, by the processing circuit, a target position; and
generating, by the processing circuit, the target trajectory according to the target position.

4. The robot controlling method of claim 1, wherein the operation of generating the repulsive force parameter comprises:
regarding, by the processing circuit, direction of the first vector as direction of the repulsive force parameter, and adjusting value of the repulsive force parameter according to value of the first vector.

5. The robot controlling method of the claim 1, wherein the operation of generating the virtual force parameter comprises:
regarding, by the processing circuit, direction of the second vector as direction of the virtual force parameter when an acting direction of the critical control point and direction of the second vector is opposite; and
setting, by the processing circuit, the virtual force parameter to be zero when the acting direction of the critical control point and direction of the second vector is not opposite.

6. The robot controlling method of claim 1, further comprising:
adding, by the processing circuit, the attractive force parameter and the repulsive force parameter and converting into a speed command;
converting, by the processing circuit, the virtual force parameter into a constrained command; and
obtaining, by the processing circuit, the control signal according to the speed command and the constrained command.

7. A motion computing device, comprising:
a processing circuit;
a memory, electrically connected to the processing circuit; and
one or more programs, wherein the one or more programs are stored in the memory and configured to be executed by the processing circuit, the one or more programs comprising instructions for:
receiving a depth image obtained from a depth camera;
obtaining an object parameter according to the depth camera;
generating an attractive force parameter according to a target trajectory;
regarding an obstacle point of the object parameter as initial point of a first vector and a second vector;
regarding an end effector of a robot as terminal point of the first vector;
generating a repulsive force parameter according to the first vector;
regarding a closest control point to the obstacle point among a plurality of control points of the robot as a critical control point, and regarding the critical control point as terminal point of the second vector,
generating a virtual force parameter according to the second vector; and
outputting a control signal to the robot to drive the robot according to the attractive force parameter, the repulsive force parameter and the virtual force parameter.

8. The motion computing device of claim 7, wherein the instruction for generating the repulsive force parameter comprising:
regarding direction of the first vector as direction of the repulsive force parameter, and adjusting value of the repulsive force parameter according to value of the first vector.

9. The motion computing device of claim 7, wherein the instruction for generating the virtual force parameter comprising:
regarding direction of the second vector as direction of the virtual force parameter when an acting direction of the critical control point and direction of the second vector is opposite; and
setting the virtual force parameter to be zero when the acting direction of the critical control point and direction of the second vector is not opposite.

10. A robot system, comprising:
a robot, comprising a plurality of control points;
a depth camera, configured to obtain a depth image; and
a motion computing device, configured to receive the depth image and output a control signal to drive the robot according to the depth image, the motion computing device comprising:
a processing circuit;
a memory, electrically connected to the processing circuit; and
one or more programs, wherein the one or more programs are stored in the memory and configured to be executed by the processing circuit, the one or more programs comprising instructions for:
receiving the depth image obtained from the depth camera;
obtaining an object parameter according to the depth camera;
generating an attractive force parameter according to a target trajectory;
regarding an obstacle point of the object parameter as initial point of a first vector, and regarding an end effector of the robot as terminal point of the first vector;
generating a repulsive force parameter according to the first vector;
identifying a critical control point according to a plurality of control points of the robot, and generating a virtual force parameter according to a second vector between the object parameter and the critical control point; and
outputting the control signal to the robot to drive the robot according to the attractive force parameter, the repulsive force parameter and the virtual force parameter.

11. The robot system of claim 10, wherein the one or more programs further comprises instructions for:
generating an object point cloud according to the depth image; and
obtaining the object parameter according to the object point cloud, wherein the object parameter comprises an obstacle point.

12. The robot system of claim 10, wherein the one or more programs further comprises instructions for:
generating a target position according to a task; and
generating the target trajectory according to the target position.

13. The robot system of claim 10, wherein the instruction for generating the repulsive force parameter comprising:
regarding direction of the first vector as direction of the repulsive force parameter, and adjusting value of the repulsive force parameter according to the value of the first vector.

14. The robot system of claim 10, wherein the one or more programs further comprises instructions for:
regarding an obstacle point of the object parameter as initial point of the second vector, and regarding a closest control point to the obstacle point among the control points of the robot as the critical control point, and regarding the critical control point as terminal point of the second vector.

15. The robot system of claim 14, wherein the instruction for generating the virtual force parameter comprising:
regarding direction of the second vector as direction of the virtual force parameter when an acting direction of the critical control point and direction of the second vector is opposite; and
setting the virtual force parameter to be zero when the acting direction of the critical control point and direction of the second vector is not opposite.

16. The robot system of claim 10, wherein the one or more programs further comprises instructions for:
adding the attractive force parameter and the repulsive force parameter and converting to a speed command;
converting the virtual force parameter to a constrained command; and
obtaining the control signal according to the speed command and the constrained command.

17. The robot system of claim 10, wherein the one or more programs further comprises instructions for:
regarding a closest control point to an obstacle point among the control points of the robot as the critical control point, and regarding the critical control point as terminal point of the second vector.

* * * * *